(12) United States Patent
Veerasamy (10) Patent No.: US 8,679,271 B2
(45) Date of Patent: Mar. 25, 2014

(54) VACUUM INSULATED GLASS (VIG) UNIT INCLUDING NANO-COMPOSITE PILLARS, AND/OR METHODS OF MAKING THE SAME

(71) Applicant: Guardian Industries Corp., Auburn Hills, MI (US)

(72) Inventor: Vijayen S. Veerasamy, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 13/749,836

(22) Filed: Jan. 25, 2013

(65) Prior Publication Data

US 2013/0136875 A1    May 30, 2013

Related U.S. Application Data

(62) Division of application No. 12/923,839, filed on Oct. 8, 2010.

(51) Int. Cl.
*E06B 3/66* (2006.01)
*E04C 2/54* (2006.01)

(52) U.S. Cl.
USPC .......................................................... 156/109

(58) Field of Classification Search
USPC .......................................... 156/104, 107, 109
See application file for complete search history.

(56) References Cited

U.S. PATENT DOCUMENTS

| | | | |
|---|---|---|---|
| 49,167 A | 1/1865 | Stetson | |
| 1,370,974 A | 3/1921 | Kirlin | |
| 1,448,351 A | 3/1923 | Kirlin | |
| 1,774,860 A | 9/1930 | Wendler et al. | |
| 2,011,557 A | 8/1935 | Anderegg | |
| 2,625,717 A | 1/1953 | Wampler et al. | |
| 2,962,409 A | 11/1960 | Ludlow et al. | |
| 3,441,924 A | 4/1969 | Peek et al. | |
| 3,742,600 A | 7/1973 | Lowell | |
| 3,902,883 A | 9/1975 | Bayer | |
| 3,912,365 A | 10/1975 | Lowell | |
| 3,936,553 A | 2/1976 | Rowe | |
| 3,974,316 A | 8/1976 | Jacquemin et al. | |
| 4,064,300 A | 12/1977 | Bhangu | |
| 4,130,408 A | 12/1978 | Crossland et al. | |

(Continued)

FOREIGN PATENT DOCUMENTS

| | | |
|---|---|---|
| EP | 0 831 973 | 3/1998 |
| FR | 2 483 564 | 4/1981 |

(Continued)

OTHER PUBLICATIONS

U.S. Appl. No. 12/923,839, filed Oct. 8, 2010; Veerasamy.

(Continued)

*Primary Examiner* — Donald J Loney
(74) *Attorney, Agent, or Firm* — Nixon & Vanderhye P.C.

(57) ABSTRACT

Certain example embodiments of this invention relate to composite pillar arrangements for VIG units that include both harder and softer materials. The softer materials are located on the outside or extremities of the central, harder pillar material. In certain example embodiments, a high aspect ratio mineral lamellae is separated by an organic "glue" or polymer. When provided around a high strength pillar, the combination of the pillar and such a nano-composite structure may advantageously result in superior strength compared to a monolithic system, e.g., where significant wind loads, thermal stresses, and/or the like are encountered.

8 Claims, 6 Drawing Sheets

(56) References Cited

U.S. PATENT DOCUMENTS

| | | | |
|---|---|---|---|
| 4,130,452 | A | 12/1978 | Indri |
| 4,173,668 | A | 11/1979 | Hentzelt et al. |
| 4,305,982 | A | 12/1981 | Hirsch |
| 4,334,941 | A | 6/1982 | Neely |
| 4,433,016 | A | 2/1984 | Neely, Jr. et al. |
| 4,485,601 | A | 12/1984 | De Boel |
| 4,486,482 | A | 12/1984 | Kobayashi et al. |
| 4,514,450 | A | 4/1985 | Nowobilski et al. |
| 5,124,185 | A * | 6/1992 | Kerr et al. ............ 428/34 |
| 5,891,536 | A * | 4/1999 | Collins et al. .......... 428/34 |
| 6,541,083 | B1 | 4/2003 | Landa et al. |
| 2007/0178256 | A1 * | 8/2007 | Landon ............ 428/34 |

FOREIGN PATENT DOCUMENTS

| | | |
|---|---|---|
| FR | 2 482 161 | 11/1981 |
| JP | 2002-226238 | 8/2002 |
| WO | WO 96/12862 | 5/1996 |
| WO | WO 99/47466 | 9/1999 |
| WO | WO 01/21924 | 3/2001 |

OTHER PUBLICATIONS

U.S. Appl. No. 12/659,352, filed Mar. 4, 2010; Veerasamy.

U.S. Appl. No. 12/659,353, filed Mar. 4, 2010; Veerasamy.

U.S. Appl. No. 12/659,354, filed Mar. 4, 2010; Veerasamy.

* cited by examiner

VACUUM INSULATED GLASS (VIG) UNIT INCLUDING NANO-COMPOSITE PILLARS, AND/OR METHODS OF MAKING THE SAME

This application is a divisional of application Ser. No. 12/923,839 filed Oct. 8, 2010, the entire disclosure of which is hereby incorporated herein by reference in this application.

FIELD OF THE INVENTION

Certain example embodiments of this invention relate to pillars used in vacuum insulated glass (VIG) units. More particularly, certain example embodiments of this invention relate to composite pillar arrangements for VIG units that include both harder and softer materials, with the latter being located on the outside or extremities of the central pillar material. In certain example embodiments, a high aspect ratio mineral lamellae is separated by an organic "glue" or polymer that, when provided around a high strength pillar, advantageously may result in superior strength compared to a monolithic system, e.g., where significant wind loads, thermal stresses, and/or the like are encountered.

BACKGROUND AND SUMMARY OF EXAMPLE EMBODIMENTS OF THE INVENTION

Vacuum IG units are known in the art. For example, see U.S. Pat. Nos. 5,664,395, 5,657,607, and 5,902,652, the disclosures of which are all hereby incorporated herein by reference.

Figure 1:
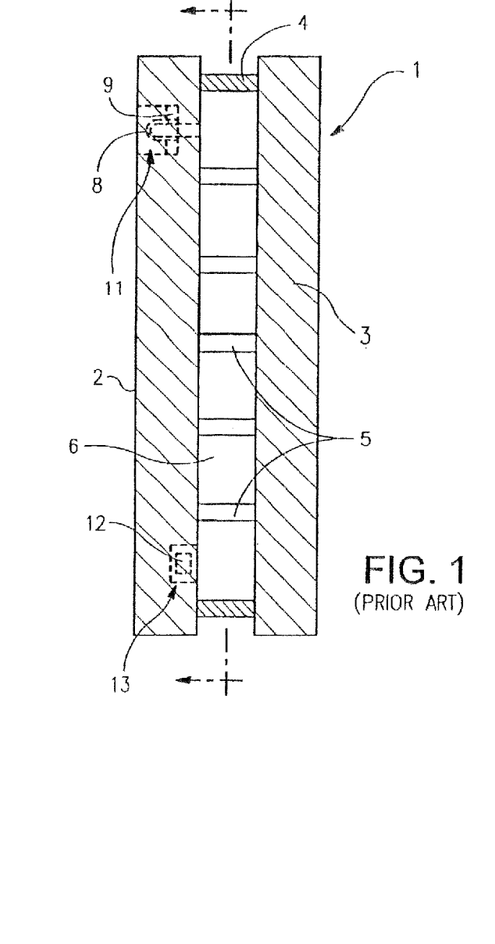
FIG. 1 is a prior art cross-sectional view of a conventional vacuum IG unit.
Figure 2:
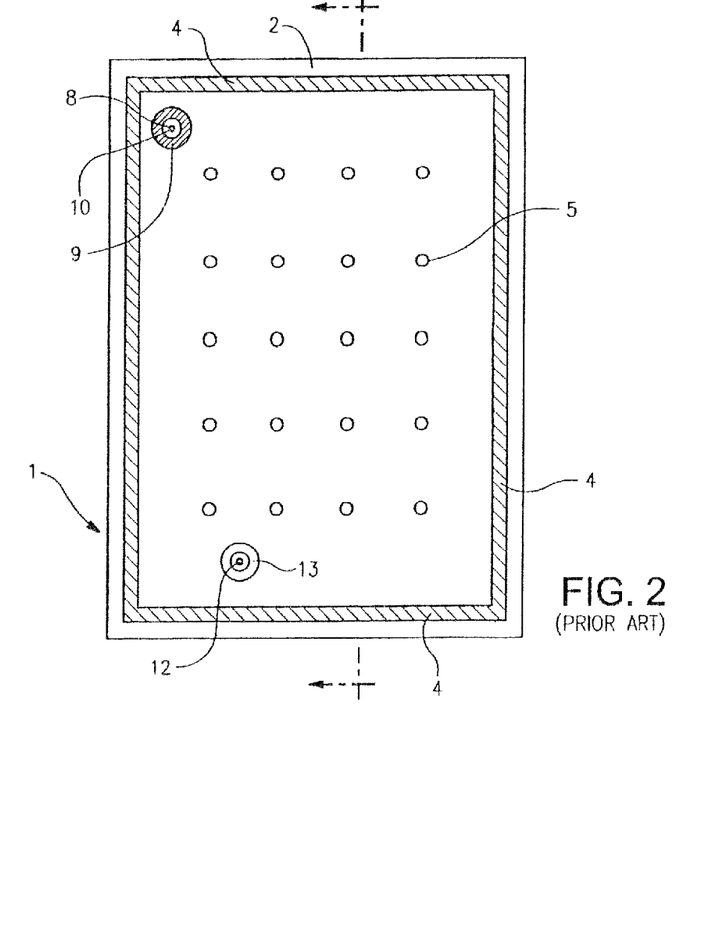
FIG. 2 is a prior art top plan view of the bottom substrate, edge seal, and spacers of the FIG. 1 vacuum IG unit taken along the section line illustrated in FIG. 1.

FIGS. 1-2 illustrate a conventional vacuum IG unit (vacuum IG unit or VIG unit). Vacuum IG unit 1 includes two spaced apart glass substrates 2 and 3, which enclose an evacuated or low pressure space 6 therebetween. Glass sheets/substrates 2 and 3 are interconnected by peripheral or edge seal of fused solder glass 4 and an array of support pillars or spacers 5.

Pump out tube 8 is hermetically sealed by solder glass 9 to an aperture or hole 10 which passes from an interior surface of glass sheet 2 to the bottom of recess 11 in the exterior face of sheet 2. A vacuum is attached to pump out tube 8 so that the interior cavity between substrates 2 and 3 can be evacuated to create a low pressure area or space 6. After evacuation, tube 8 is melted to seal the vacuum. Recess 11 retains sealed tube 8. Optionally, a chemical getter 12 may be included within recess 13.

Conventional vacuum IG units, with their fused solder glass peripheral seals 4, have been manufactured as follows. Glass frit in a solution (ultimately to form solder glass edge seal 4) is initially deposited around the periphery of substrate 2. The other substrate 3 is brought down over top of substrate 2 so as to sandwich spacers 5 and the glass frit/solution therebetween. The entire assembly including sheets 2, 3, the spacers, and the seal material is then heated to a temperature of approximately 500° C., at which point the glass frit melts, wets the surfaces of the glass sheets 2, 3, and ultimately forms hermetic peripheral or edge seal 4. This approximately 500° C. temperature is maintained for from about one to eight hours. After formation of the peripheral/edge seal 4 and the seal around tube 8, the assembly is cooled to room temperature. It is noted that column 2 of U.S. Pat. No. 5,664,395 states that a conventional vacuum IG processing temperature is approximately 500° C. for one hour. Inventors Lenzen, Turner and Collins of the '395 patent have stated that "the edge seal process is currently quite slow: typically the temperature of the sample is increased at 200° C. per hour, and held for one hour at a constant value ranging from 430° C. and 530° C. depending on the solder glass composition." After formation of edge seal 4, a vacuum is drawn via the tube to form low pressure space 6.

Figure 3:
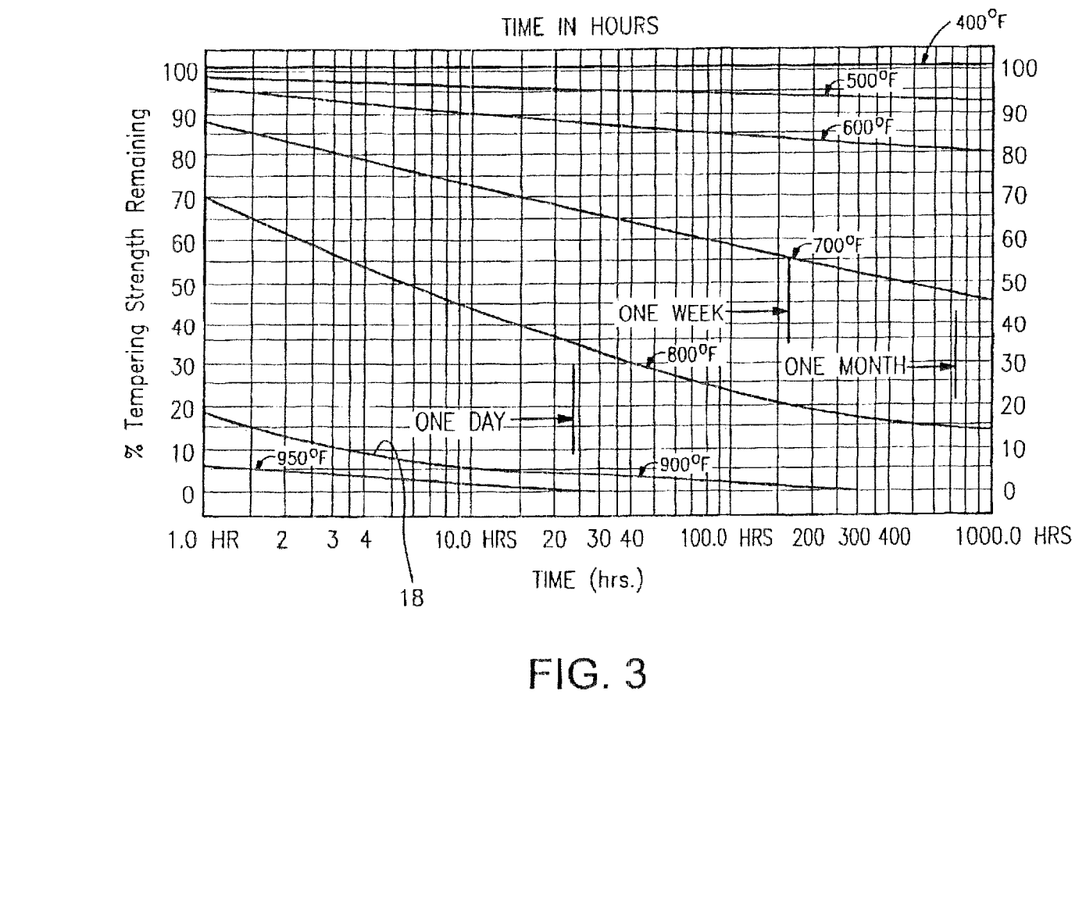
FIG. 3 is a graph correlating time (hours) versus percent tempering strength remaining, illustrating the loss of original temper strength for a thermally tempered sheet of glass after exposure to different temperatures for different periods of time.
Figure 4:
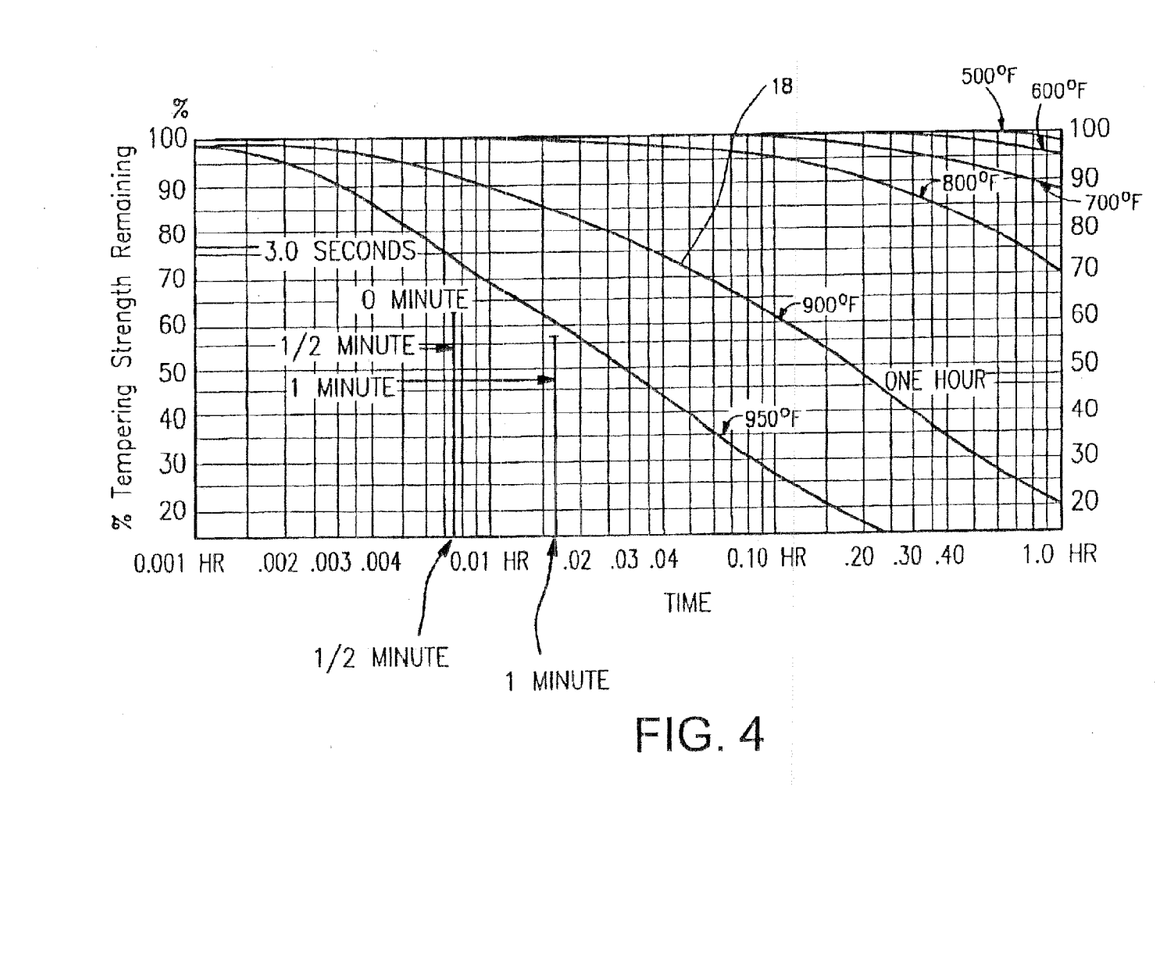
FIG. 4 is a graph correlating time versus percent tempering strength remaining similar to that of FIG. 3, except that a smaller time period is provided on the x-axis.

Unfortunately, the aforesaid high temperatures and long heating times of the entire assembly utilized in the formulation of edge seal 4 are undesirable, especially when it is desired to use a heat strengthened or tempered glass substrate(s) 2, 3 in the vacuum 10 unit. As shown in FIGS. 3-4, tempered glass loses temper strength upon exposure to high temperatures as a function of heating time. Moreover, such high processing temperatures may adversely affect certain low-E coating(s) that may be applied to one or both of the glass substrates in certain instances.

FIG. 3 is a graph illustrating how fully thermally tempered plate glass loses original temper upon exposure to different temperatures for different periods of time, where the original center tension stress is 3,200 MU per inch. The x-axis in FIG. 3 is exponentially representative of time in hours (from 1 to 1,000 hours), while the y-axis is indicative of the percentage of original temper strength remaining after heat exposure. FIG. 4 is a graph similar to FIG. 3, except that the x-axis in FIG. 4 extends from zero to one hour exponentially.

Seven different curves are illustrated in FIG. 3, each indicative of a different temperature exposure in degrees Fahrenheit (° F.). The different curves/lines are 400° F. (across the top of the FIG. 3 graph), 500° F., 600° F., 700° F., 800° F., 900° F., and 950° F. (the bottom curve of the FIG. 3 graph). A temperature of 900° F. is equivalent to approximately 482° C., which is within the range utilized for forming the aforesaid conventional solder glass peripheral seal 4 in FIGS. 1-2. Thus, attention is drawn to the 900° F. curve in FIG. 3, labeled by reference number 18. As shown, only 20% of the original temper strength remains after one hour at this temperature (900° F. or 482° C.). Such a significant loss (i.e., 80% loss) of temper strength is of course undesirable.

In FIGS. 3-4, it is noted that much better temper strength remains in a thermally tempered sheet when it is heated to a temperature of 800° F. (about 428° C.) for one hour as opposed to 900° F. for one hour. Such a glass sheet retains about 70% of its original temper strength after one hour at 800° F., which is significantly better than the less than 20% when at 900° F. for the same period of time.

Another advantage associated with not heating up the entire unit for too long is that lower temperature pillar materials may then be used. This may or may not be desirable in some instances.

Even when non-tempered glass substrates are used, the high temperatures applied to the entire VIG assembly may soften the glass or introduce stresses, and partial heating may introduce more stress. These stresses may increase the likelihood of deformation of the glass and/or breakage.

Moreover, VIG units are subject to extremely large static and dynamic loading as well as thermally induced stresses both during its manufacturing (e.g., during pump down and thermal seal processing) and throughout its service life (e.g., during wind-loads or mechanical and thermal shocks). The pillar spacers used to mechanically support the gap between the two substrates tend to indent the glass surfaces with which they in contact, thereby creating indented areas from which cracks may propagate and hence weakening the glass structure. The glass region just above the pillar is under compressive stress, whereas the peripheral region of the pillar is under tensile stress. It has been found that it is in the tensile regime that annealed glass is at its weakest state, and it has been found that any surface and bulk flaws in the tensile stress field may develop into cracks that may propagate. The magnitude of the tensile stress component increases with the inter-pillar spacing, and the likelihood of the cracks forming and ensuing catastrophic breakage increases once the stress field is above the strength of the glass. The surface profile or contour of the pillar is related to the likelihood of any kind of Hertzian or coin shaped cracks.

One way to mitigate the indentation crack issue (e.g., while still being aggressive on pillar spacing) is to use glass that has been tempered such that the surface skin of the glass is in a highly compressive stress that tends to "wash out" the tensile stress components induced by supporting pillars. Unfortunately, however the VIG process takes place at high temperatures and involves a thermal cycle duration that potentially can de-temper the glass.

Thus, it will be appreciated that there is a need in art to find a solution to the problems of and associated with indentation cracking. It also will be appreciated that there is a need in the art for improved VIG units, and/or methods of making the same.

In certain example embodiments of this invention, a vacuum insulated glass (VIG) unit is provided. First and second substantially parallel, spaced apart glass substrates define a gap therebetween. An edge seal is provided around a periphery of the first and second substrates to form an hermetic seal. A plurality of pillars is provided between the first and second substrates. A lamellar coating is provided around at least a portion of the pillars so as to impart closure stresses on the first and/or second substrates proximate to the pillars to at least partially offset tensile stresses also applied to the first and/or second glass substrates. The gap is provided at a pressure less than atmospheric.

In certain example embodiments of this invention, a vacuum insulated glass (VIG) unit is provided. First and second substantially parallel, spaced apart glass substrates define a gap therebetween. An edge seal is provided around a periphery of the first and second substrates to form an hermetic seal. A plurality of pillars is provided between the first and second substrates. A high-aspect ratio lamellar coating is provided between said pillars and the first and/or second substrates so as to at least partially offset tensile stresses applied to the first and/or second glass substrates. The gap is provided at a pressure less than atmospheric.

In certain example embodiments of this invention, a method of making a vacuum insulated glass (VIG) unit is provided. First and second glass substrates are provided. A plurality of pillars are provided on the first glass substrate. The first and second substrates are sealed together (e.g., using at least one edge seal) such that the first and second substrates are in substantially parallel, spaced apart orientation to one another and to define a gap therebetween. The gap is evacuated to a pressure less than atmospheric. A lamellar coating is provided between the pillars and the first and/or second substrates so as to at least partially offset tensile stresses also applied to the first and/or second glass substrates.

In certain example embodiments of this invention, a VIG unit is provided. First and second substantially parallel, spaced apart glass substrates define a gap therebetween. An edge seal is provided around a periphery of the first and second substrates to form a seal. A plurality of pillars is provided between the first and second substrates, with each said pillar being at least partially laminated with a material selected to impart closure stresses on the first and/or second substrates proximate to the pillar to at least partially offset tensile stresses also applied to the first and/or second glass substrates. The gap is provided at a pressure less than atmospheric.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

It will be appreciated that from a structural perspective, it would be advantageous to provide a VIG unit with a high stiffness and high damping behavior when it is subjected to dynamic loading. Further, it would be advantageous to provide the VIG unit with a high storage modulus to dissipate the energy. High damping or loss factor (tan δ) expressed as the ratio of loss modulus to the storage modulus is also desirable when attempting to avoid catastrophic failure of the VIG unit. Certain example embodiments therefore incorporate high Tg materials (such as, for example, $MoSi_2$, graphite platelets, etc.) and/or heat resistant polymers (such as, for example, aramids, silicones, etc.) in composite pillar arrangements. Alternatively, or in addition, certain example embodiments may incorporate carbon nanotubes (CNTs) in composite pillar arrangements, where such CNTs may be oriented such that they are generally perpendicular or generally parallel to the top and/or bottom bases of the pillars.

More particularly, certain example embodiments relate to a composite pillar arrangement that includes both hard and softer materials, with the latter being located on the outside or extremities of the central pillar material. In certain example embodiments, the pillar may be shaped substantially as spheres, cylinders, donuts, C-rings, or any other suitable shape, and they may be of or include hard and high strength ceramics encapsulated with a nano-composite coating of or including polymeric, ceramic, and/or metallic components arranged in a lamellar structure. The latter provides toughness, ductility, and visco-elastcity. CNTs that are generally perpendicular or generally parallel to the top and/or bottom bases of the pillars also may be used in certain example embodiments as they tend not to burn off at high temperatures, and they me disposed on the pillars via a CNT inclusive ink, from a metal catalyst (e.g., out of a hot gas), etc. See, for example, application Ser. Nos. 12/659,352; 12/659,353; and 12/659,354, the entire contents of which are hereby incorporated herein by reference.

Lamellar structures generally include fine, alternating layers of materials in the form of lamellae. In certain example embodiments of this invention, in general, the nano-composite pillar coatings include building blocks on the nanometer scale. In certain example embodiments, a high aspect ratio mineral lamellae is separated by an organic "glue" or polymer. This may result in certain cases in superior strength compared to a monolithic system in circumstances where significant wind loads and thermal stresses are encountered. The lamellar structure is oriented substantially parallel to the sliding surface, resulting in a high hearing-load combined with low shear stress, in certain example embodiments. Applications in metal forming that involve plastic deformation, for example, may utilize solid lubricants.

Figure 5:
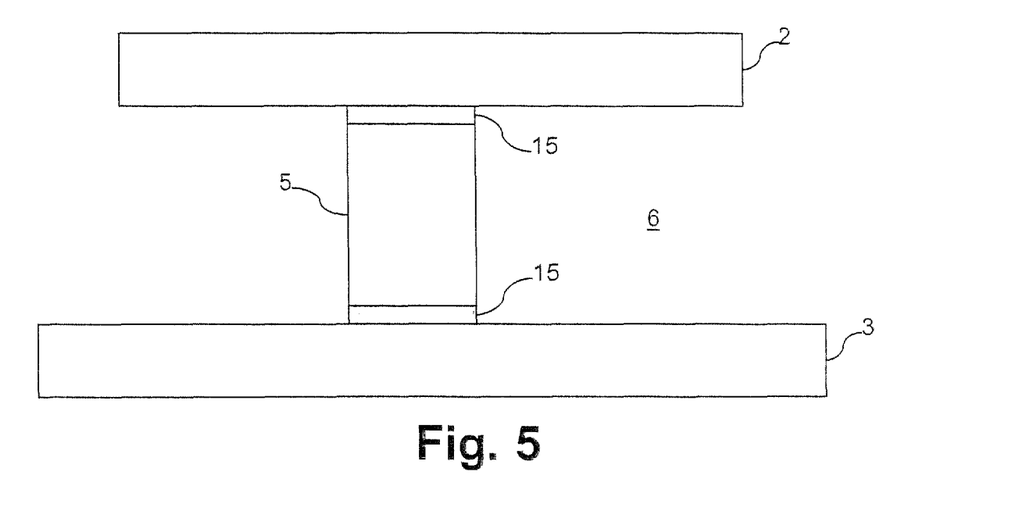
FIG. 5 is a cross-sectional view of a VIG unit incorporating a soft, lamellar coating and a hard pillar in accordance with certain example embodiments.

FIG. 5 is a cross-sectional view of a VIG unit incorporating a soft, lamellar coating and a hard pillar in accordance with certain example embodiments. FIG. 5 is similar to FIGS. 1 and 2, except that lamellar coatings 15 are provided between the pillar 5 and the first and second substrates 2 and 3. The lamellar coatings 15 may be applied to the substrates prior to the placement of the pillar 5 in certain example embodiments. For instance, the lamellar coatings 15 may be applied in a pattern on the substrates 2 and 3, they may applied across substantially the entire surfaces of the substrates 2 and 3, etc. In certain example embodiments, however, the lamellar coatings 15 may be applied to the pillars 5 directly. The pillars 5 may be coated at their edges and ends, they may be only on their ends, they may be substantially entirely encapsulated by the coating, etc. In any event, the lamellar coatings 15 may be disposed (directly or indirectly) on the substrates 2 and 3 and/or the pillars 5 by any suitable technique including, for example, dip, spin, spray, roll, gravure, or other suitable technique. In certain example embodiments, the pillars may be sapphire pillars.

Figure 6:
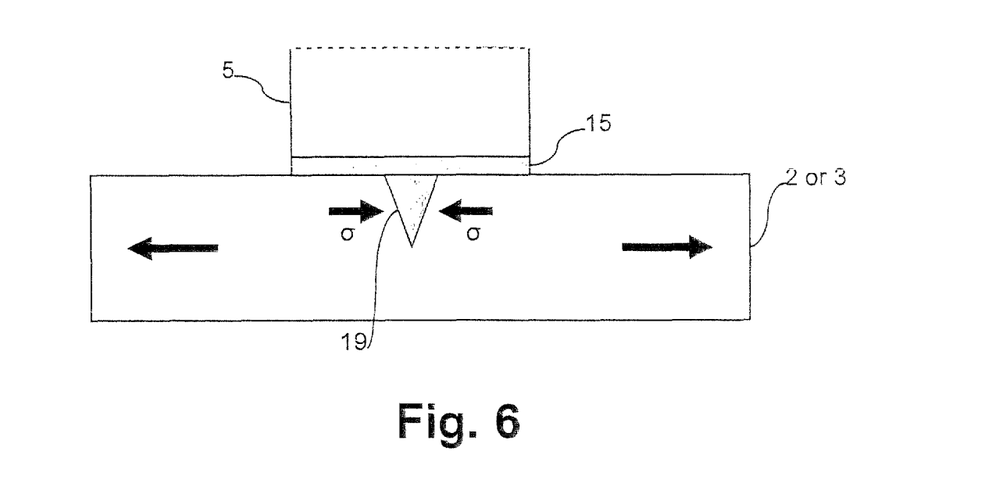
FIG. 6 is an enlarged portion of the FIG. 5 example embodiment that demonstrates the stress-reducing features of certain example embodiments.

FIG. 6 is an enlarged portion of the FIG. 5 example embodiment that demonstrates the stress-reducing features of certain example embodiments. The large arrows proximate to the edges of the substrate 2 or 3 represent the tension that the glass is under due to the pillars. In contrast, the triangular area 19 represents the closure stress applied by the lamellar coatings 15. This closure stress, which also is a form of tensile stress, may be quantified as discussed in greater detail below and is denominated as τ. This closure stress may compensate for or otherwise offset some or all of the tension that the class is under.

Examples of softer phase coating materials will now be provided. $MoS_2$, like graphite, has a hexagonal crystal structure that is easy to shear. $MoS_2$ lubrication performance often exceeds that of graphite and is effective in vacuum, as well, whereas graphite is not necessarily as effective. The temperature limitation of $MoS_2$ at about 400 degrees C. is restricted by oxidation. The particle size and film thickness parameters may be matched to the surface roughness of the substrate. Large particles may result in excessive wear by abrasion caused by impurities in the $MoS_2$, whereas small particles may result in accelerated oxidation. These parameters may be balanced in embodiments where $MoS_2$ is used as a softer phase coating material. As alluded to above, graphite also may be used as a softer phase coating material. CNTs also may be used, as indicated above.

Boron nitride (e.g., hexagonal boron nitride) is another example softer phase coating material that may be used in connection with certain example embodiments. Boron nitride is a ceramic powder lubricant that has been found that have a high temperature resistance of about 1200 degrees C. in an oxidizing environment.

Polytetrafluoroethylene (PTFE), unlike the other solid lubricants discussed herein, does not have a layered structure. Rather, the macro-molecules of PTFE slip easily along each other, similar to lamellar structures. PTFE shows one of the smallest coefficients of static and dynamic friction, e.g., down to 0.04, and operating temperatures of at least about 260 degrees C. are possible with PTFE.

Another example of the proposed softer phase is a composite that is made of a nano-clay and a polymer based on aramid a polymer known to be thermally stable and extremely strong. An example material described herein is somewhat similar to a product commercially available under the tradename Kevlar from Dupont. However, unlike Kevlar, certain example embodiments involve making a polymer coating that can be cast from a solvent. This technique allows for better processing capability, lends itself to be able to receive additives, and also confers better control on attributes such as optical transparency.

More particular, a category of simple phenyl substituted non-heterocyclic diamines such as diamino-heterocycle bearing diamines such as diaminotetraphenylethylenes and diamino-triphenylamine may be used in certain example embodiments. Starting from aromatic diamines, a series of aramids and aromatic polyimides are synthesized in reasonably high viscosities using a low-temperature solution polycondensation and a two-step poly-addition, followed by cyclodehydration at high temperature. Polymers with high viscosities may be obtained by changing the type of diamine used. The polyamides so formed were amorphous and readily soluble in organic solvents, despite having high viscosities. The solvents used were N-methyl-2-pyrrolidone (NMP), N-Ndimethylacetamide (DMAc), and m-cresol.

Soluble aramids with high viscosity advantageously produced a transparent, highly flexible, and tough film upon casting from DMAc. Such coatings had high Tg, ranging form about 330-350 degrees C. In fact, the temperature at which there was a 10% weight loss was above about 500 degrees C. in air.

In certain example embodiments, nano-clay additives may be used in a polymer overcoat. For instance, prior to casting of the aramid polymer, about 5-10 wt. % of nano-clay may be added to the polymer dissolved in DMAc. After sonication for about 30 minutes, a nano-composite is formed, containing organically-treated clay that separates into nanometer-sized platelets and disperses throughout the polymer matrix (e.g., in a substantially even manner). The additive has a large aspect ratio that helps set the composite's properties.

In certain example embodiments, the polymer film may be cast over a batch of pillars and cured to form a coating around pillar materials made of harder ceramics than the composite coating. Unlike other fillers, clay particles at the nano-size scale possess unique characteristics. For example, the nano-clay particles are in platelet form with thickness of just 1 nm and width of about 70-150 nm in certain instances. In certain example embodiments, the platelet size may be 1-10 nm thick and 35-300 nm in width, more preferably 1-5 nm thick and 60-200 width. This high aspect ratio imparts and fosters anisotropic characteristics to films that embed these particles. Platelets of these example sizes may be said to be nanometer-sized. Although certain example embodiments refer to "platelets," it will be appreciated that the exact shape and/or orientation of such particles need not necessarily be plate-shaped. Other, more spherical, oblong, and/or other shapes and/or orientations may be used in connection with embodiments of this invention.

The nano-clay particles may be viewed as an "inorganic polymer" phase comparable in size to the polymeric macromolecular component. This enables the formation of hybrids with novel physico-chemical properties. Such nano-composites may, for example, be use to encapsulate metallic or ceramic pillars. In place of, or in addition to the particular nano-clays described above, moissonite or any silica or mica based platelet material may be used. Also as indicated above, graphite, CNTs, and/or the like may be used together with or in place of a nano-clay.

The specific surface area in certain example implementations is of the order of about 700-800 sq/g. Therefore, the loading of only a few percent by weight (e.g., 1-15%, more preferably 1-10%, and still more preferably 2-8%) of nano-clay into a polymer matrix may drastically alter the properties because of the high interfacial interaction. The optical transparency of the coating film may remain substantially unaltered, as the nano-size particles are too fine to scatter the visible light (e.g., d<<λ). In other words, the inclusion of a nano-clay and polymer composite coating may have substantially no effect on visible transmission.

An example improvement may be imparted by the nano-clay to the coating and eventually to the VIG pillar so as to help reduce the likelihood of crack formation and buffer dynamic loads. This improvement may be based on, for example, the high interfacial area leading to strong adsorption of the aramid polymer molecules which, in turn, anchors the segmental motion of the polymers; the high aspect ratio providing a rigid layer structure; chemical inertness, unlike glass materials under high stress; the existence of interlayer gaps or galleries of from about, for example, 1-5 mm into which intercalated species may be inserted; dynamic expandability of the gallery by several times with movement of macromolecules; etc.

The stress state in composites may be multi-axial and non-uniform, even for a uni-axial loading because of the complex interaction between the fiber and matrix. Hence, care should be taken to study the dynamic behavior of the nano-composites, including understanding the elastic and fracture properties as well as potential interactions between fiber-matrix interface.

VIG units may benefit from the incorporation of nano-composite materials provided to harder pillars. For instance, the incorporation of such materials may provide for enhanced heat resistance. Nano-clay increases the dimensional stability and the heat distortion temperature or T10 of the films. There is a marked reduction in weight loss upon heating due to the decrease in decomposition by-products. Another advantage is that the transparency of the pillars increases with the nano-clay. Another advantage relates to the ability to match the expansion coefficient through the selection of the materials used in the nano-composite. Still another advantage relates to the environmental stability of the polymer during exposure to UV. The ablative nature of the polymer related to UV exposure is substantially reduced through the incorporation of nano-composites.

In certain example embodiments, strength optimization may be performed according to the following.

Figure 7:
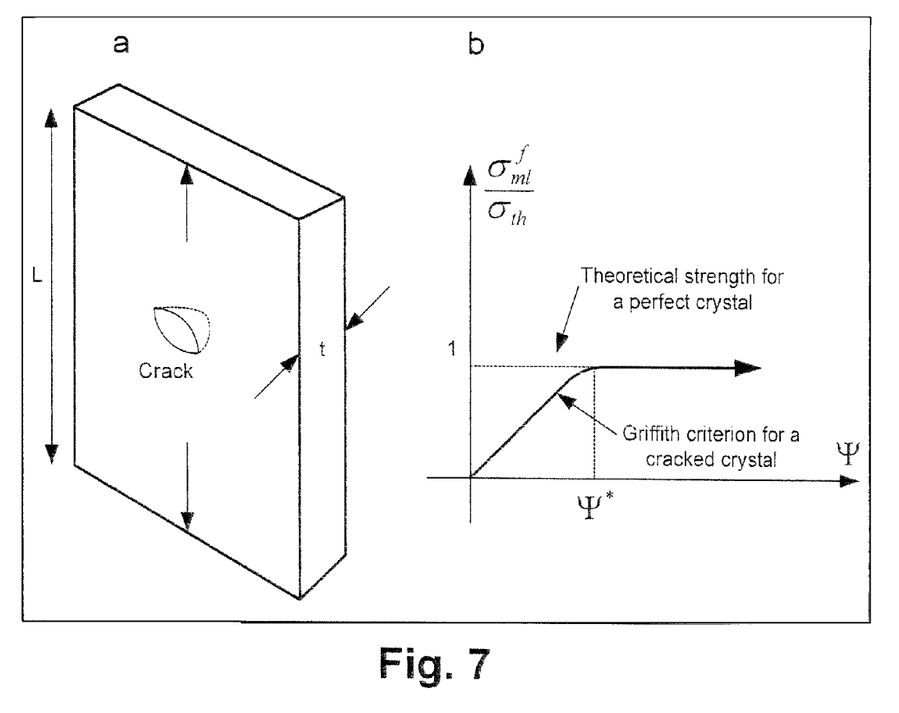
FIG. 7 is a schematic view supporting the example strength optimization techniques of certain example embodiments.

FIG. 7 is a schematic view supporting the example strength optimization techniques of certain example embodiments. FIG. 7 shows that crack formation affects the material specimen strength at the macro-scale and not always at the nano-scale. Consider, for example, the following formulas:

$$\frac{\sigma_{ml}}{\sigma_{th}} = \frac{\sqrt{\pi} E_i \Psi}{\sigma_{th}} \quad (1a)$$

$$\Psi = \sqrt{\frac{\gamma}{E_{ml} t}} \quad (1b)$$

Note also that:

$$\text{Lim} \frac{\sigma_{ml}}{\sigma_{th}} \to 1$$
$$t \to t_{cr}$$
$$\Psi \to \Psi^*$$

Thus:

$$t_{cr} = \pi \left[ \frac{\gamma E_i}{\sigma_{th}^2} \right] \quad (2)$$

$$\left[ \frac{\gamma E_i}{\sigma_{th}^2} \right]$$

is the characteristic length scale.

For the purposes of the FIG. 7 example graph and the example equations above, τ is tensile strength, $E_i$ is Young's Modulus, τ is shear strength, γ is surface energy, and t is thickness. This assumes that γ=1 J/m2, $E_i$=100 GPa, σi=$E_i$/30, and $t_{cr}$ is about 30 nm.

Figure 8:
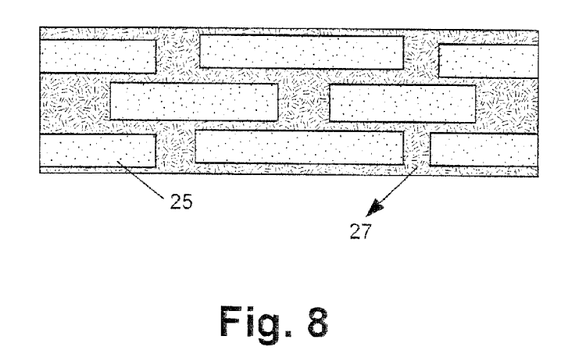
FIG. 8 is a simplified schematic view demonstrating how a mineral or inorganic lamellae may be bound in an organic matrix in accordance with certain example embodiments.
Figure 9:
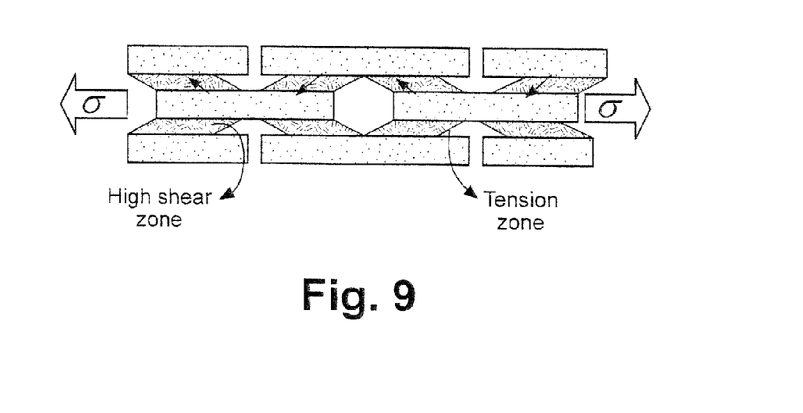
FIG. 9 is a simplified view demonstrating how the arrangement in FIG. 8 may be capable of withstanding both tensile and shear stresses in accordance with certain example embodiments.

FIG. 8 is a simplified schematic view demonstrating how a mineral or inorganic lamellae 25 may be bound in an organic matrix 27 in accordance with certain example embodiments, and FIG. 9 is a simplified view demonstrating how the arrangement in FIG. 8 may be capable of withstanding both tensile and shear stresses in accordance with certain example embodiments. The mineral or inorganic lamellae 25 may be able to sustain large tensile stresses without fracturing. This may be facilitated by virtue of the organic or softer matrix 27, which helps to transfer the load between mineral crystals in the mineral or inorganic lamellae 25. The organic matrix itself, and/or the organic matrix/mineral layer interface therefore may be able to sustain high shear stresses without failure. Example high shear and tension zones are shown in FIG. 9, as are the overall tensile stresses (as indicated, for example, with the σ arrows).

In other words:

$$\sigma_i = \rho \cdot \tau_p \quad (3)$$

$$\frac{L}{t} = \frac{\sigma_{th}}{\tau_p} \quad (4)$$

Figure 10:
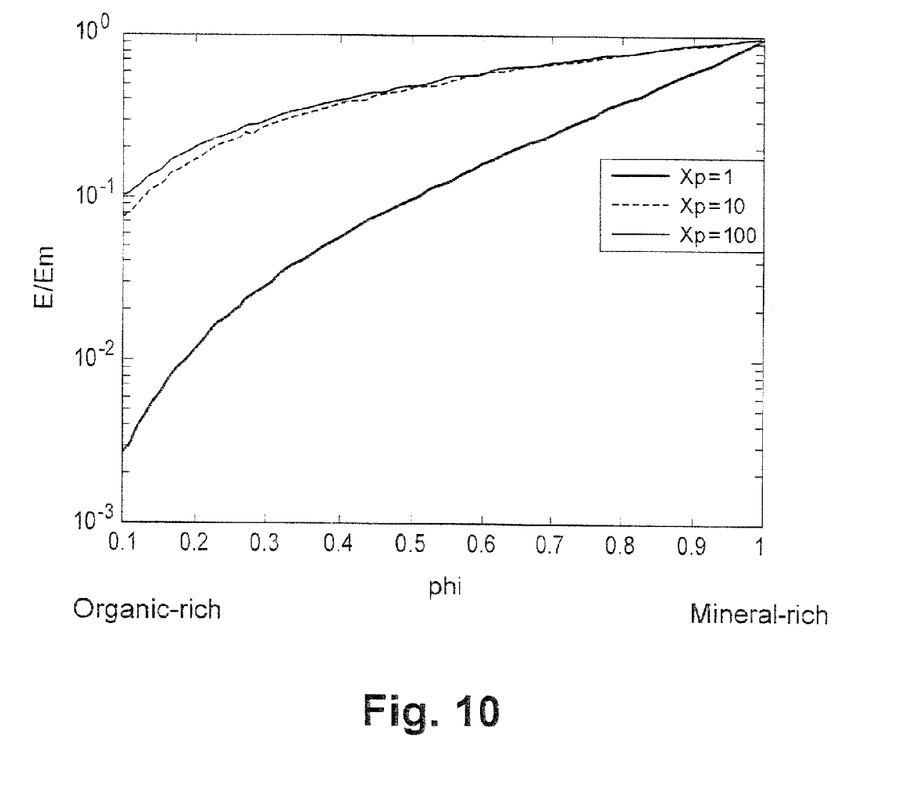
FIG. 10 is a graph showing a normalized stiffness-composition relationship in accordance with certain example embodiments.

FIG. 10 is a graph showing a normalized stiffness-composition relationship in accordance with certain example embodiments. The x-axis goes from organic-rich to mineral-rich (phi), where $0<\phi<1$. The y-axis plots $E/E_m$ where:

$$\frac{E_m}{E} = \frac{4(1-\phi)}{X_p^2\phi^2} + \frac{1}{\phi} \qquad (5)$$

for different Xp values. Xp, in turn, is calculated according to the following equation:

$$X_p = \frac{G_p}{E_m} \cdot \rho^2.$$

Certain design parameters have been found to impact the above. For instance, it has been determined that at a critical thickness scale, theoretical strength rather than the Griffith criterion, controls fracture strength, implying an insensitivity to pre-existing flaws. An desirable aspect ration may be given by a ratio of tensile strength of the mineral layer (ML) and shear strength of the organic matrix. The amount of allowable organic or softer content may be determined as a product of the aspect ratio and organic matrix shear to Young's moduli ratio.

It will be appreciated that the matrix or overcoat described in connection with certain example embodiments may be a polymer-based or polymer-inclusive overcoat. However, in certain example embodiments, other material such as silicone and/or the like may be used as a potential overcoat or matrix to be loaded with nanometer-sized platelets. In general, materials having a Tg of at least about 200 degrees C. will be acceptable, with Tg of at least about 250 degrees being preferable, and Tg of at least about 300 degrees being still more preferable.

"Peripheral" and "edge" seals herein do not mean that the seals are located at the absolute periphery or edge of the unit, but instead mean that the seal is at least partially located at or near (e.g., within about two inches) an edge of at least one substrate of the unit. Likewise, "edge" as used herein is not limited to the absolute edge of a glass substrate but also may include an area at or near (e.g., within about two inches) of an absolute edge of the substrate(s). Also, it will be appreciated that as used herein the term "VIG assembly" refers to an intermediate product prior to the VIG's edges being sealed and evacuation of the recess including, for example, two parallel-spaced apart substrates. Also, while a component may be said to be "on" or "supported" by one or more of the substrates herein, this does not mean that the component must directly contact the substrate(s). In other words, the word "on" covers both directly and indirectly on, so that the component may be considered "on" a substrate even if other material (e.g., a coating and/or thin film) is provided between the substrate and the component.

It will be appreciated that the example embodiments described herein may be used in connection with a variety of different VIG assembly and/or other units or components. For example, the substrates may be glass substrates, heat strengthened substrates, tempered substrates, etc.

The terms "heat treatment" and "heat treating" as used herein mean heating the article to a temperature sufficient to enabling thermal tempering, bending, and/or heat strengthening of the glass. This includes, for example, heating an article to a temperature of at least about 580 or 600 degrees C. for a sufficient period to enable tempering and/or heat strengthening, more preferably at least about 600 degrees C., and sometimes to 625 degrees C. In some instances, the HT may be for at least about 4 or 5 minutes.

It is noted that the glass substrate(s) may be heat treated in certain example embodiments so that the glass substrate(s) is/are either heat strengthened or thermally tempered (e.g., at a temperature of at least about 580 degrees C., more preferably at least about 600 degrees C., and often at least about 620 or 640 degrees C.).

Certain example embodiments may provide localized heating to and/or IR heating of the frits as disclosed in, for example, application Ser. Nos. 12/000,663 and 12/000,791, the entire contents of each which are hereby incorporated herein by reference. This may be facilitated by designing the frit of certain example embodiments to absorb infrared, e.g., in the 800-2000 nm regions (or any sub-regions therein). This may be accomplished, for example, by providing additives that will absorb these wavelengths. These additives may be provided at various times including, for example, during the batch recipe of the frit and melted into the glass frit, added as powder to the base powdered frit, etc. In such cases, the frit preferably will heat up and melt while having only a small, if any, impact on the beads included in the mixture.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making a vacuum insulated glass (VIG) unit, the method comprising:
   providing first and second glass substrates;
   providing a plurality of spacers;
   sealing together the first and second substrates such that the first and second substrates are in substantially parallel, spaced apart orientation to one another and to define a gap therebetween; and
   evacuating the gap to a pressure less than atmospheric,
   wherein a first lamellar coating is provided between the spacers and the first substrate, and a second lamellar coating is provided between the spacers and the second substrate so as to at least partially offset tensile stresses also applied to the first and second glass substrates, and wherein the first lamellar coatings is provided across substantially the entire surface of the first glass substrate, and the second lamellar coatings is provided across substantially the entire surface of the second glass substrate.

2. The method of claim 1, wherein the first and second lamellar coatings each comprise one of $MoS_2$ having a substantially crystal structure, graphite, and PTFE.

3. The method of claim 1, wherein at least one of the lamellar coatings comprises a nano-clay and polymer composite coating.

4. The method of claim 3, wherein the nano-clay and polymer composite coating comprises nanometer-sized platelets dispersed throughout an aramid polymer matrix or overcoat.

5. The method of claim 4, wherein the platelets are approximately 1-10 nm thick and 35-300 nm in width.

6. The method of claim 5, wherein the nano-clay and polymer composite coating has substantially no impact on visible transmission.

7. The method of claim 3, wherein the nano-clay and polymer composite coating comprises 2-8% by weight nano-clay.

8. The method of claim 1, wherein each of said spacers comprises at least one carbon nanotube.

* * * * *